United States Patent
Yao et al.

(10) Patent No.: US 7,623,293 B2
(45) Date of Patent: Nov. 24, 2009

(54) OPTICAL ELEMENT AND THE LIGHT SOURCE APPARATUS UTILIZING THE SAME

(75) Inventors: Po-Hung Yao, Luzhu Shiang (TW); Ben-Sheng Lin, Hsinchu (TW); Heng-Chun Huang, Miaoli (TW); Yu-Nan Pao, Zhubei (TW); I-Kai Pan, Kaohsiung (TW); Yi-Ting Sun, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 307 days.

(21) Appl. No.: 11/143,598

(22) Filed: Jun. 3, 2005

(65) Prior Publication Data

US 2006/0239028 A1 Oct. 26, 2006

(30) Foreign Application Priority Data

Apr. 22, 2005 (TW) .............................. 94112814 A (51) Int. Cl.
    G02B 27/10 (2006.01)
(52) U.S. Cl. ...................................................... 359/619
(58) Field of Classification Search .......... 359/619–625
    See application file for complete search history.

(56) References Cited

U.S. PATENT DOCUMENTS

| | | | | |
|---|---|---|---|---|
| 5,863,115 A | * | 1/1999 | Simon | ........................ 362/332 |
| 6,046,846 A | * | 4/2000 | van de Ven | .................. 359/455 |
| 6,277,471 B1 | | 8/2001 | Tang | ........................... 428/172 |
| 6,280,063 B1 | | 8/2001 | Fong et al. | .................... 362/333 |
| 6,456,436 B2 | * | 9/2002 | Miura et al. | ................. 359/619 |
| 6,628,460 B1 | * | 9/2003 | Ookawa et al. | ............. 359/455 |
| 7,092,163 B2 | * | 8/2006 | Bastawros et al. | .......... 359/599 |
| 7,199,930 B2 | * | 4/2007 | Yao et al. | ..................... 359/619 |
| 7,255,456 B2 | * | 8/2007 | Yao et al. | ..................... 362/225 |
| 2005/0134965 A1 | * | 6/2005 | Poulsen | ....................... 359/619 |
| 2007/0047258 A1 | * | 3/2007 | Yao et al. | ..................... 362/615 |

FOREIGN PATENT DOCUMENTS

| | | |
|---|---|---|
| JP | 2004311263 | 11/2004 |
| WO | WO01/79895 A2 | 10/2001 |

* cited by examiner

*Primary Examiner*—Ricky L Mack
*Assistant Examiner*—Vipin M Patel
(74) *Attorney, Agent, or Firm*—WPAT, PC; Justin King (57) ABSTRACT

The present invention discloses an optical element, having a first optical surface and a second optical surface for receiving an incident light, the optical element comprising: at least a transparent diffusion unit, for scattering the incident light, each being placed on the first optical surface; and at least a transparent collimation unit, for collimating the incident light, each being place on the first optical surface abutted and adjacent to the diffusion unit in an alternative manner.

9 Claims, 7 Drawing Sheets

OPTICAL ELEMENT AND THE LIGHT SOURCE APPARATUS UTILIZING THE SAME

1. FIELD OF THE INVENTION

The present invention relates to an optical element and the light source apparatus utilizing the same, and more particularly, to an optical element having at least a diffusion unit and at least a collimation unit formed on a surface thereof.

2. BACKGROUND OF THE INVENTION

Nowadays, it is commonly seen that backlight modules are used for electronic devices with flat panel displays, which includes devices as small as hand-held palm pilots and as large as big-screen TVs. A typical backlight consists of a light source, such as Cold Cathode Fluorescent (CCFL) or Light Emitting Diodes (LED), a light guide, a diffuser, and a brightness enhancement film. The design challenge of a backlight module is to generate uniform illumination across the LCD surface and luminance that is high enough to produce good contrast in a day environment (so that you can see the display of a laptop computer or a handheld electronic device, for example, with the room lights on), by the cooperation of the diffuser and the brightness enhancement film. Although, Taiwan is now one of the three major production countries for Notebook PCs, the critical component, backlight modules, still has to be imported and there is a heavy reliance on foreign providers. Thus, it is imperative for Taiwan to establish the design and production technology. Moreover, a conventional backlight usually consists of a plurality of optical films, which is the cause of low luminous efficacy, high manufacture cost and low assembly yield, and so on.

Figure 1:
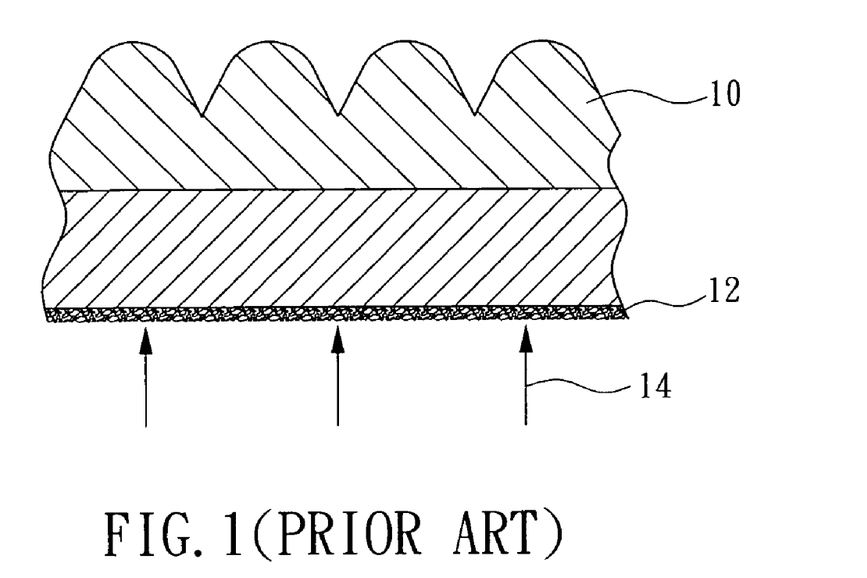
FIG. 1 is cross-sectional view of a multi-layer brightness enhancement article disclosed in U.S. Pat. No. 6,280,063.

Please refer to FIG. 1, which is a cross-sectional view of a multi-layer brightness enhancement article disclosed in U.S. Pat. No. 6,280,063, entitled "Brightness Enhancement Article". The brightness enhancement article of FIG. 1 can achieve the objects of collimating and diffusing incident light 14 by respectively forming an array of linear prism 10 having blunted or rounded peaks on the upper surface of the substrate thereof and forming a layer of light scattering protrusions 12 on the lower surface of the substrate thereof, so as to enable a backlight module employing the disclosed brightness enhancement article to generate uniform illumination with increased brightness. However, since the diffusion layer and the collimation layer of the disclosed brightness enhancement article are formed by two separate processes and the incident light 14 is emitting at random after being scattered by the plural light scattering protrusions 12, therefore, there are still space to be improved as to the luminous efficacy and the manufacturing cost.

Figure 2:
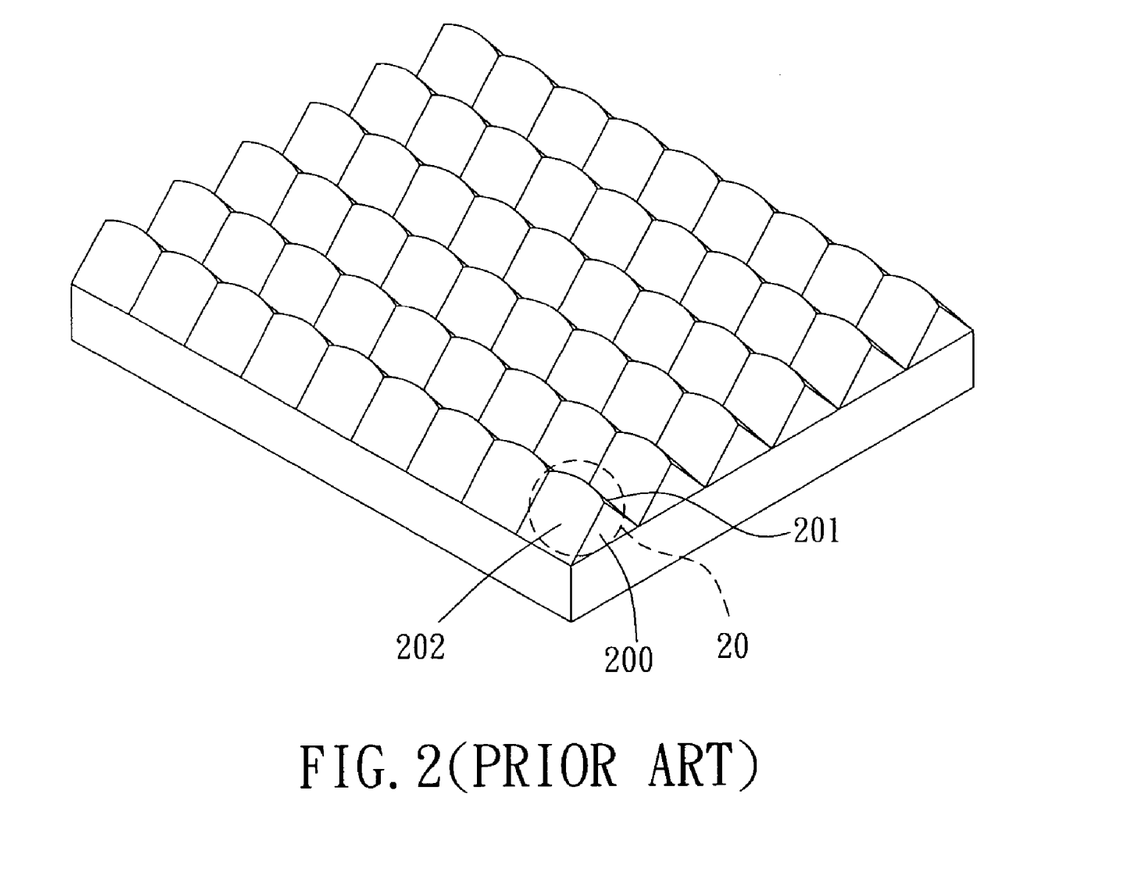
FIG. 2 is a perspective view of a brightness enhancement film disclosed in U.S. Pat. No. 6,277,471.

Please refer to FIG. 2, which is a perspective view of a brightness enhancement film disclosed in U.S. Pat. No. 6,277,471, entitled "Brightness Enhancement Film". The brightness enhancement film of FIG. 2 has a brightness layer adhesively attached to the top surface of a base thereof, wherein the brightness layer is formed by aligning a plurality of prisms 200 side-by-side in a parallel plane and each prism is formed by aligning a plurality of brightness unit 20 adjacent to one another in a straight line while each brightness unit 20 substantially comprises of curved facet 202 and planar facet 201. The light penetrating the brightness unit 20 is refracted to a region thereby enhancing optical performance in two dimensions. However, the level of skill needed to process and form the geometrical structure of the disclosed brightness enhancement film is high that it is not feasible for mass production.

Therefore, it is in great demand to have an improved optical element capable of overcoming the shortcomings of prior arts.

SUMMARY OF THE INVENTION

In view of the disadvantages of prior art, the primary object of the present invention is to provide an optical element with enhanced luminous efficiency, achieved by utilizing a plurality of microstructures with light collimation and diffusion capability formed thereon.

Another object of the invention is to provide an optical element and the light source apparatus utilizing the same, characterized in that the optical element is integrally manufactured by rolling a roller embossed with microstructures on an optical substrate for imprinting the microstructures thereon and thus the manufacturing cost of the optical element can be reduced.

To achieve the above objects, the present invention provides an optical element, having a first optical surface and a second optical surface for receiving an incident light, the optical element comprising:

at least a transparent diffusion unit, for diffusing the incident light, each being placed on the first optical surface; and at least a transparent collimation unit, for collimating the incident light, each being place on the first optical surface abutted and adjacent to the diffusion unit in an alternative manner.

In a preferred embodiment of the invention, the diffusion unit further comprises at least a semi-lenticular lens, characterized by a specific depth preferably in the range of 10 microns to 500 microns, moreover, the collimation unit further comprises at least a prism characterized by a vertex angle preferably in the range of 30° to 140°.

In another preferred embodiment of the invention, the second optical surface can be an optical surface selected from the group consisting of a rugged surface and a smooth surface.

To achieve the above objects, the present invention further features a light source apparatus, comprising:

a reflector;

a light guide plate, arranged over the reflector;

at least a light source, arranged at a side of the light guide plate for emitting an incident light; and at least an optical element, arranged at a position over the light guide plate, each having a first optical surface and a second optical surface for receiving the incident light, each optical element further comprising:

at least a transparent diffusion unit, for diffusing the incident light, each being placed on the first optical surface; and at least a transparent collimation unit, for collimating the incident light, each being place on the first optical surface abutted and adjacent to the diffusion unit in an alternative manner.

In a preferred embodiment of the invention, the diffusion unit further comprises at least a semi-lenticular, lens characterized by a specific depth preferably in the range of 10 microns to 500 microns, moreover, the collimation unit further comprises at least a prism, characterized by a vertex angle preferably in the range of 30° to 140°.

In another preferred embodiment of the invention, the second optical surface can be an optical surface selected from the group consisting of a rugged surface and a smooth surface.

Yet, preferably, the light source apparatus of the invention can comprises two optical elements, wherein the orientation of one of the two optical elements is being rotate by an angle in the range of 0° to 90° to be placed overlapping another optical element.

Other aspects and advantages of the present invention will become apparent from the following detailed description, taken in conjunction with the accompanying drawings, illustrating by way of examples about the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 3A:
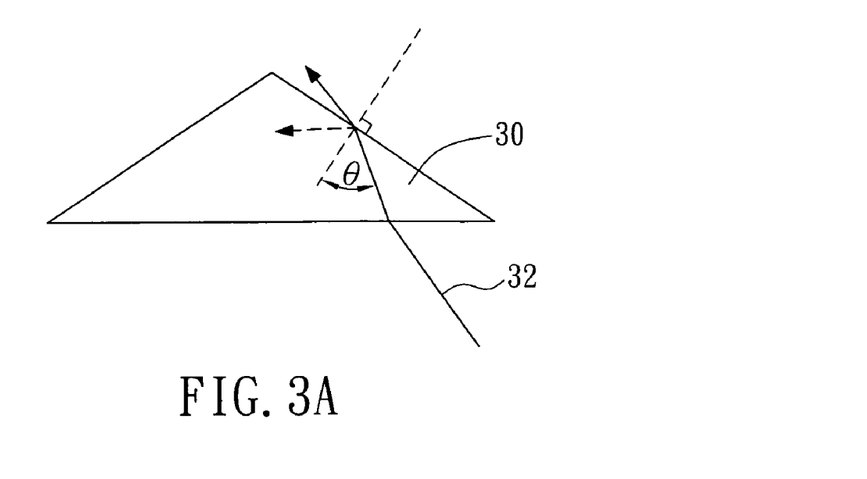
FIG. 3A is a schematic diagram depicting the optical characteristics of a prism shaped lens.

According to Snell's Law, it is noted that a prism shaped lens can be used to collimate light effectively as seen in FIG. 3A, that is, it can reduce the divergent angle of an incident light. In FIG. 3A, when an incident light 32 traveling in the prism 30 is traveling across an interface from the prism 30 to the external environment by an angle of θ, i.e. from a media with higher refractive index to another media with lower refractive index, at the condition that the incident angle θ is larger than the critical angle of total internal reflection, then the light is totally reflected off the interface following the dotted arrow of FIG. 3A, on the other hand, when the incident angle θ is smaller than the critical angle of total internal reflection, the exiting light, shown as the solid arrow of FIG. 3A, will bend away from the normal of the interface (i.e. the dotted line of FIG. 3A).

Figure 3B:
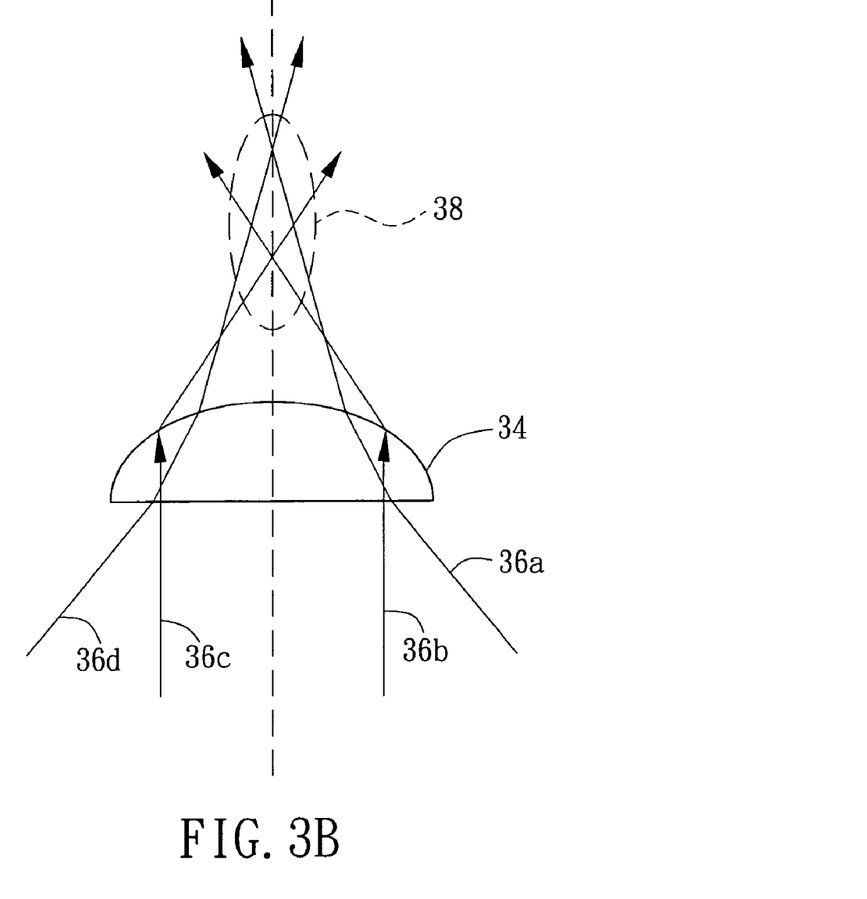
FIG. 3B is a schematic diagram depicting the optical characteristics of a semi-lenticular lens shaped lens.

Please refer to FIG. 3B, which is a schematic diagram depicting the optical characteristics of a semi-lenticular lens shaped lens. It is noted that a semi-lenticular lens shaped lens can be used to controllably scatter light within a specific range. As seen in FIG. 3B, as four incident light 36a, 36b, 36c and 36d, each incident to the lens 34 by different angles, is traveling across an interface from the lens 34 to the external environment, all the exiting light corresponding respectively to the four incident light will converge in the convergence area 38 and then dissipate. Accordingly, the exiting angle of the light with large incident angle can be controlled to converge so as to enable all the incident light to be uniformly and controllably diffused.

Thus, by forming microstructures with the two abovementioned geometric characteristics on a surface of an optical element, the optical element is enabled to collimate as well as scatter light. Hence, the optical element having at least a prism and at least a semi-column aligned and arranged alternatively on a surface thereof is equipped with light collimation and diffusion capability.

Figure 4:
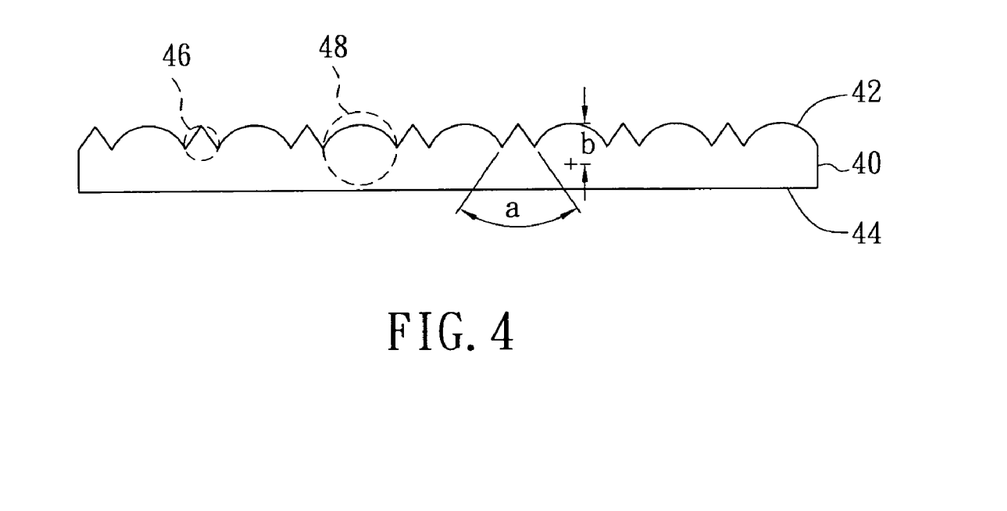
FIG. 4 is cross-sectional view of an optical element according to the present invention.

Please refer to FIG. 4, which is cross-sectional view of an optical element according to the present invention. The optical element 40 of the present invention has a first optical surface 42 and a second optical surface 44, wherein a plurality of prism 46 and a plurality of semi-lenticular lens 48 are aligned and arranged alternatively on the first surface 42, and the second optical surface 44 are used for receiving incident light. The function of each prism 46 is to collimate light and thus is addressed as the collimation unit while the function of each semi-lenticular lens 48 is to diffuse light and thus is addressed as the diffusion unit. Since each prism 46 is characterized by a vertex angle a and the semi-lenticular lens is characterized by a specific depth b, the light collimation and diffusion capability of the optical element 40 can be controlled by the proper selection of the vertex angle a, the specific depth b, and the material of the optical element 40 (i.e. the refractive index of the optical element 40).

Figure 5:
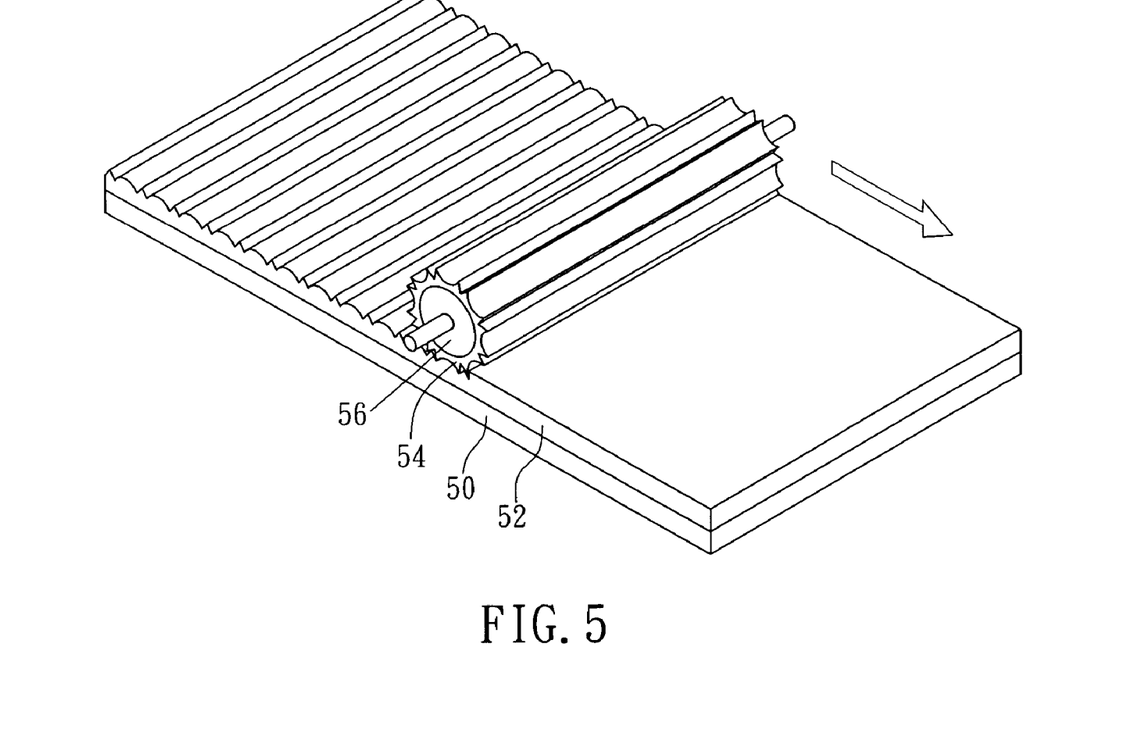
FIG. 5 is a schematic diagram showing a rolling process for manufacturing an optical element of the invention.

FIG. 5 depicts a process for manufacturing the optical element of the invention. The process for manufacturing the optical element of the invention comprises the steps of:

coating a layer of an UV curable material 52 on a flexible substrate 50;

rolling a roller 56 embossed with microstructures 54 on the layer of UV curable material 52 for patterning the UV curable material 52; and curing the layer of UV curable material 52.

Figure 6A:
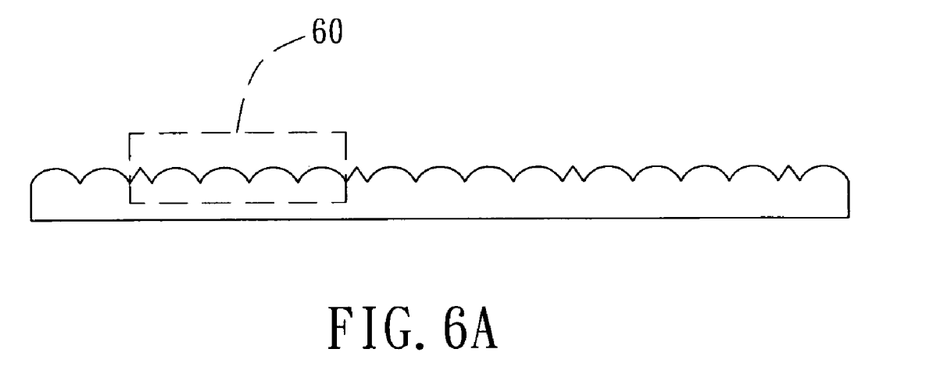
FIG. 6A is a cross-sectional view of an optical element according to a first embodiment of the invention.
Figure 6B:
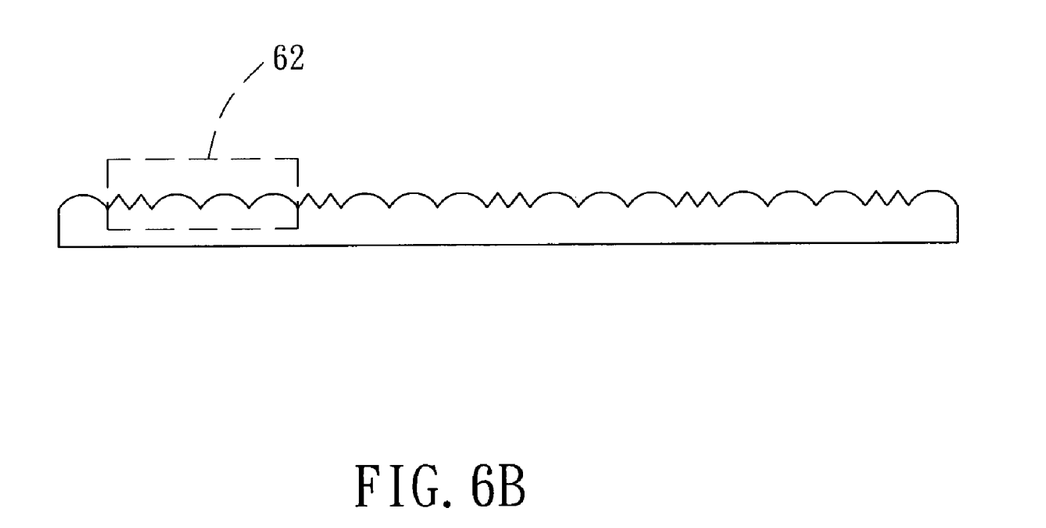
FIG. 6B is a cross-sectional view of an optical element according to a second embodiment of the invention.

In a preferred embodiment of the invention, the collimation unit of the invention can comprise more than one prism 46, which is similar to the diffusion unit. As seen in FIG. 6A, a basic optical unit 60 of the optical element of the invention can comprises a prism and four semi-lenticular lens; or as seen in FIG. 6B, a basic optical unit 62 of the optical element of the invention can comprises two prisms and three semi-lenticular lens, and so on.

Figure 7:
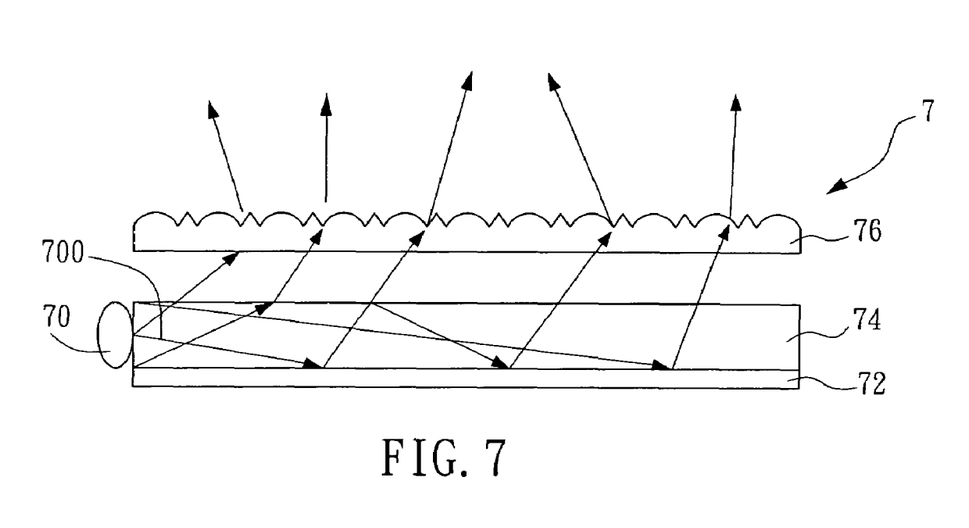
FIG. 7 is a cross-sectional view of a light source apparatus utilizing the optical element of a preferred embodiment of the present invention.

Please refer to FIG. 7, which is a cross-sectional view of a light source apparatus utilizing the optical element of a preferred embodiment of the present invention. The light source apparatus 7 of the invention comprises a light source 70, a reflector 72, a light guide plate 74, and a optical element 76; wherein the light source 70 is arranged at a side of the light guide plate 74 for emitting an incident light 700 thereto; the light guide plate 74 is arranged over the reflector 72; and the optical element 76 is arranged at a position over the light guide plate 74; thereby the optical performance of the light source apparatus 7 is enhanced and uniform since the optical element 76 is capable of diffusing and collimating the incident light 700 simultaneously in a specific direction (i.e. a display utilizing the light source apparatus can either has a better vertical viewing angle or a better horizontal viewing angle).

Figure 8:
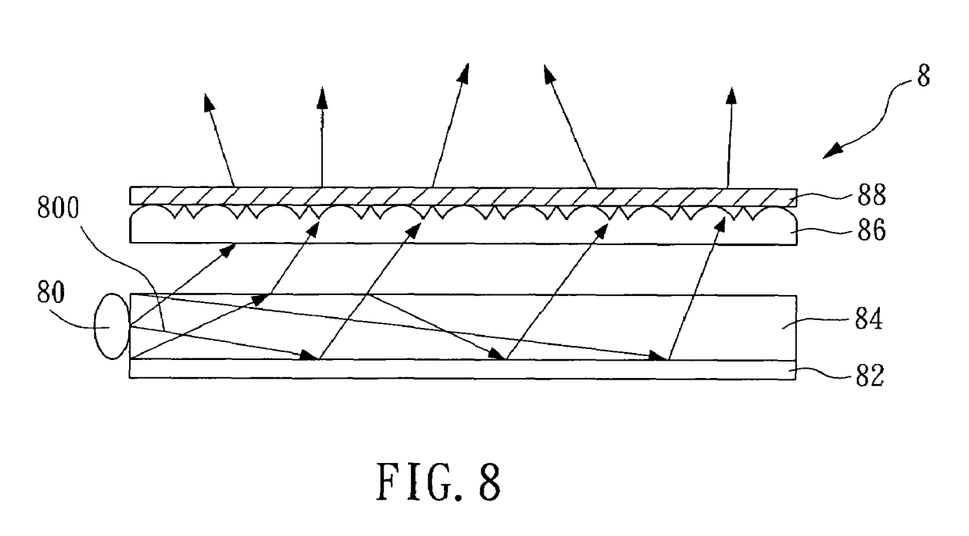
FIG. 8 is a cross-sectional view of a light source apparatus utilizing the optical element of another preferred embodiment of the present invention
Figure 9:
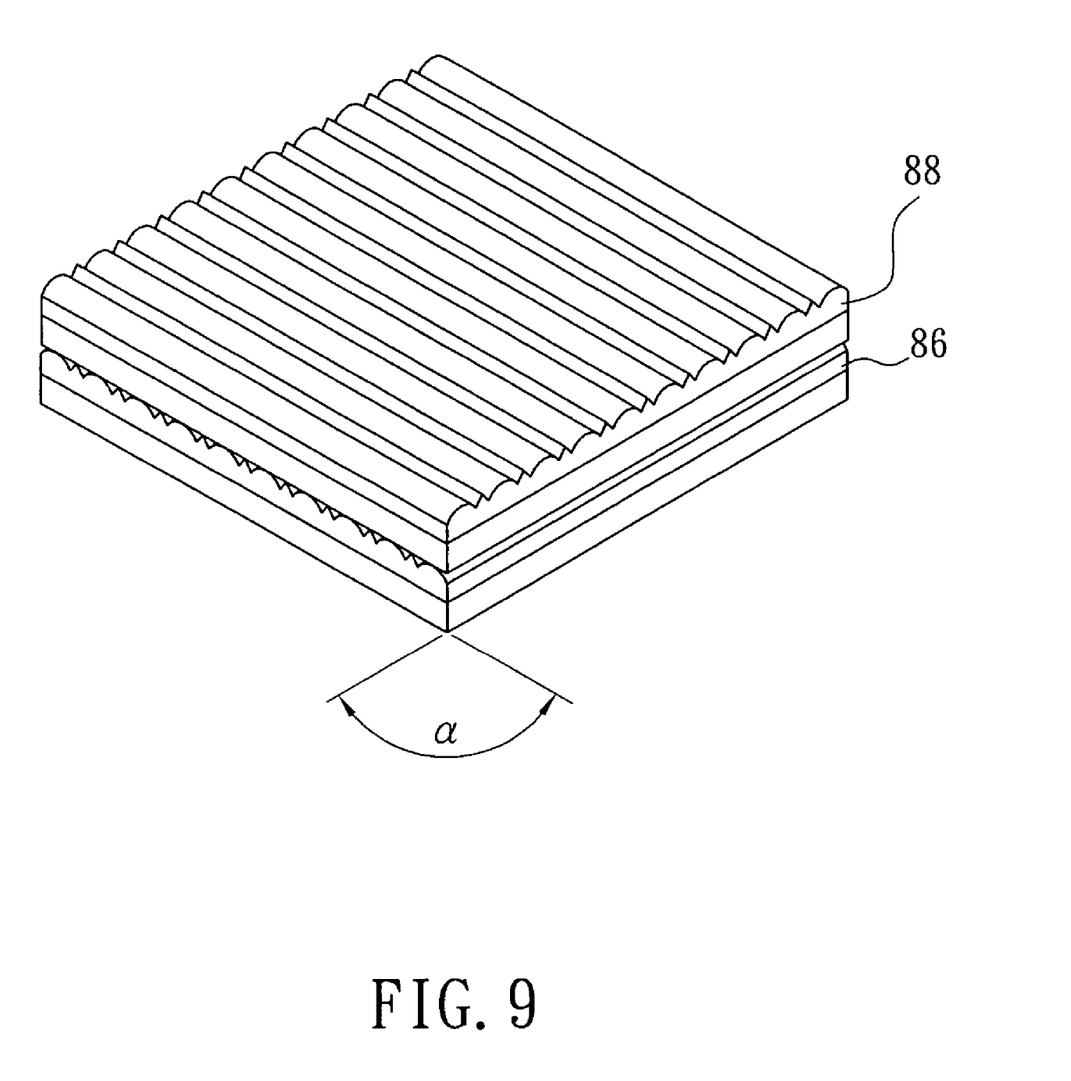
FIG. 9 is cross-sectional view of stacked optical elements according to the present invention.

Please refer to FIG. 8, which is a cross-sectional view of a light source apparatus utilizing the optical element of another preferred embodiment of the present invention. The light source apparatus 8 of the invention comprises a light source 80, a reflector 82, a light guide plate 84, and two optical elements 86, 88; wherein the light source 80 is arranged at a side of the light guide plate 84 for emitting an incident light 800 thereto; the light guide plate 84 is arranged over the reflector 82; and the orientation of the optical element 88 are being rotate by an angle α (as seen in FIG. 9) to be placed overlapping the optical element 86 while the two stacked optical elements 86, 88 are arranged at a position over the light guide plate 84; thereby the optical performance of the light source apparatus 7 is enhanced and uniform since the optical element 76 is capable of diffusing and collimating the incident light 700 simultaneously in two specific directions (i.e. the vertical viewing angle and the horizontal viewing angle of a display utilizing the light source apparatus can both be increased simultaneously).

Figure 10:
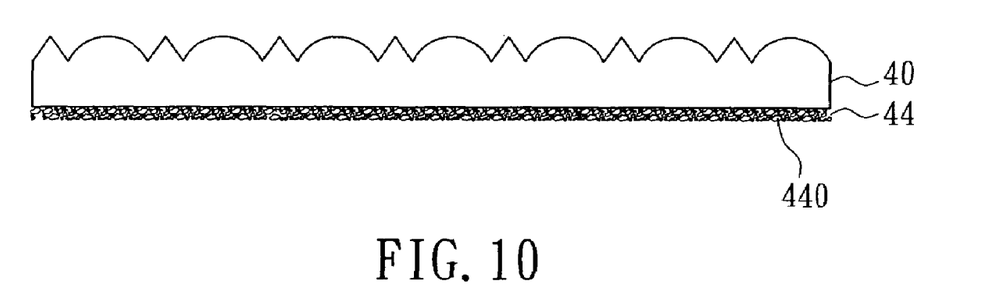
FIG. 10 is cross-sectional view of an optical element according to a third embodiment of the present invention.
Figure 11:
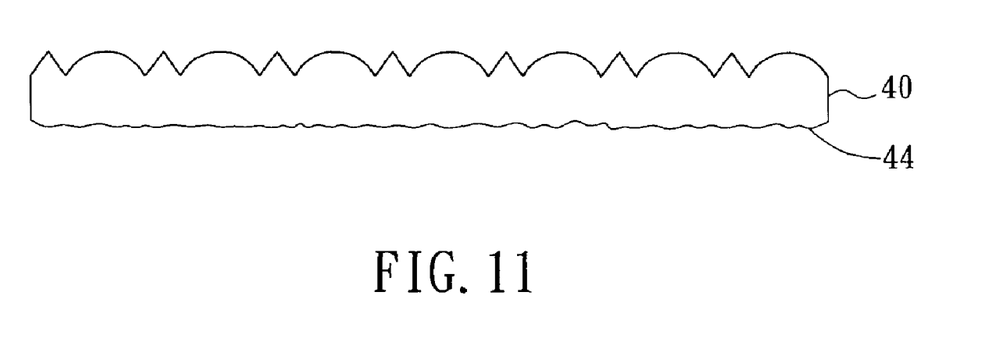
FIG. 11 is cross-sectional view of an optical element according to a fourth embodiment the present invention.

In a preferred embodiment of the invention, the a semi-lenticular lens is characterized by a specific depth preferably in the range of 10 microns to 500 microns, and a prism is characterized by a vertex angle preferably in the range of 30° to 140°. Moreover, as seen respectively in FIG. 11 and FIG. 10, the second optical surface can be an optical surface selected from the group consisting of a rugged surface and a smooth surface. When the second optical surface is designed as a rugged surface, the rugged surface either can be integrally formed while manufacturing the optical element, or can be formed by coating a layer of resin with particles 440 dispersed therein. Furthermore, in another preferred embodiment of the invention, when the light source apparatus of the invention comprises two optical elements, the orientation of one of the two optical elements is being rotate by an angle in the range of 0° to 90° to be placed overlapping another optical element.

From the above description, it is noted that the optical element of the invention is equipped with functions of light collimation and diffusion simultaneously, which can be used as the replacement for a conventional brightness enhancement film and a diffuser. Moreover, as the optical element of the invention is being applied in an light source apparatus like a backlight module, not only the luminous efficacy of the backlight module is enhanced, but also the manufacturing cost of the backlight module is reduced because of the structure of the same is simplified.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An optical element for receiving an incident light, comprising:
   a first optical surface;
   a second optical surface;
   a first transparent diffusion unit located on the first optical surface, for diffusing the incident light, wherein the first transparent diffusion unit comprises a first semi-lenticular len with a first height;
   a first transparent collimation unit located on the first optical surface and adjacent to the first transparent diffusion unit, for collimating the incident light, wherein the first transparent collimation unit comprises a first prism with a second height,
   a second transparent diffusion unit located on the first optical surface and adjacent to the first transparent collimation unit, for diffusing the incident light, wherein the second transparent diffusion unit comprises a second semi-lenticular len with the first height;
   a second transparent collimation unit located on the first optical surface and adjacent to the second transparent diffusion unit, for collimating the incident light, wherein the second transparent collimation unit comprises a second prism with the second height;
   wherein the second optical surface is a smooth surface and the first height equals to the second height.

2. The optical element of claim 1, wherein the first height is between 10 microns to 500 microns.

3. The optical element of claim 1, wherein the first prism is characterized by a vertex angle, and the vertex angle is between 30° to 140 .

4. The optical element of claim 1, wherein the first transparent diffusion unit further comprises a third semi-lenticular len with the first height.

5. The optical element of claim 1, wherein the first transparent diffusion unit further comprises a third semi-lenticular len with the first height.

6. A light source apparatus, comprising:
   a reflector;
   a light guide plate, arranged above the reflector;
   a light source, arranged at a side of the light guide plate for emitting an incident light; and
   an optical element, arranged above the light guide plate, said optical element further comprising;
   a first optical surface;
   a second optical surface;
   a first transparent diffusion unit located on the first optical surface, for diffusing the incident light, wherein the first transparent diffusion unit comprises a first semi-lenticular len with a first height;
   a first transparent collimation unit located on the first optical surface and adjacent to the first transparent diffusion unit, for collimating the incident light, wherein the first transparent collimation unit comprises a first prism with a second height,
   a second transparent diffusion unit located on the first optical surface and adjacent to the first transparent collimation unit, for diffusing the incident light, wherein the second transparent diffusion unit comprises a second semi-lenticular len with the first height;
   a second transparent collimation unit located on the first optical surface and adjacent to the second transparent diffusion unit, for collimating the incident light, wherein the second transparent collimation unit comprises a second prism with the second height;
   wherein the second optical surface is a smooth surface and the first height equals to the second height.

7. The optical element of claim 6, wherein the first height is between 10 microns to 500 microns.

8. The optical element of claim 6, wherein the first prism is characterized by a vertex angle, and the vertex angle is between 30° to 140°.

9. A light source apparatus, comprising:
   a reflector;
   a light guide plate, arranged above the reflector;
   a light source, arranged at a side of the light guide plate for emitting an incident light;
   a first optical element, arranged above the light guide plate, said first optical element further comprising:
   a first optical surface;

a second optical surface;
a first transparent diffusion unit located on the first optical surface, for diffusing the incident light, wherein the first transparent diffusion unit comprises a first semi-lenticular len with a first height;
a first transparent collimation unit located on the first optical surface and adjacent to the first transparent diffusion unit, for collimating the incident light, wherein the first transparent collimation unit comprises a first prism with a second height,
a second transparent diffusion unit located on the first optical surface and adjacent to the first transparent collimation unit, for diffusing the incident light, wherein the second transparent diffusion unit comprises a second semi-lenticular len with the first height;
a second transparent collimation unit located on the first optical surface and adjacent to the second transparent diffusion unit, for collimating the incident light, wherein the second transparent collimation unit comprises a second prism with the second height;
wherein the second optical surface is a smooth surface and the first height equals to the second height; and
a second optical element, arranged above the first optical element, said second optical element further comprising:
a third optical surface;
a fourth optical surface;
a third transparent diffusion unit located on the third optical surface, for diffusing the incident light, wherein the third transparent diffusion unit comprises a third semi-lenticular len with the first height;
a third transparent collimation unit located on the third optical surface and adjacent to the third transparent diffusion unit, for collimating the incident light, wherein the third transparent collimation unit comprises a third prism with the second height,
a fourth transparent diffusion unit located on the third optical surface and adjacent to the third transparent collimation unit, for diffusing the incident light, wherein the fourth transparent diffusion unit comprises a fourth semi-lenticular len with the first height;
a fourth transparent collimation unit located on the third optical surface and adjacent to the fourth transparent diffusion unit, for collimating the incident light, wherein the fourth transparent collimation unit comprises a fourth prism with the second height;
wherein the fourth optical surface is a smooth surface; and
wherein the second optical element is rotated between 0° to 90°.

* * * * *